United States Patent
Karupaya (10) Patent No.: US 8,506,227 B2
(45) Date of Patent: Aug. 13, 2013

(54) THREAD FORMING SCREW THREAD AND CORRESPONDING THREAD ROLL DIE

(75) Inventor: Balasingam Karupaya, Seremban Negeri Sembilan (MY)

(73) Assignee: Unisteel Technology International Limited, Labuan F. T. (MY)

( * ) Notice: Subject to any disclaimer, the term of this patent is extended or adjusted under 35 U.S.C. 154(b) by 339 days.

(21) Appl. No.: 12/665,281

(22) PCT Filed: Jun. 20, 2007

(86) PCT No.: PCT/SG2007/000172
§ 371 (c)(1),
(2), (4) Date: Dec. 17, 2009

(87) PCT Pub. No.: WO2008/156425
PCT Pub. Date: Dec. 24, 2008

(65) Prior Publication Data
US 2010/0196121 A1     Aug. 5, 2010

(51) Int. Cl.
*F16B 23/00* (2006.01)
(52) U.S. Cl.
USPC .......................................... 411/411; 411/414
(58) Field of Classification Search
USPC ........................................ 411/387.4, 84, 402
See application file for complete search history.

(56) References Cited

U.S. PATENT DOCUMENTS

| 2,793,884 | A | * | 5/1957 | Jungblut | 285/231 |
| 3,889,916 | A | * | 6/1975 | Ilukowicz | 249/59 |
| 4,527,932 | A | | 7/1985 | Onasch et al. | |
| 4,799,844 | A | | 1/1989 | Chuang | |
| 5,061,135 | A | | 10/1991 | Pritchard | |
| 5,312,255 | A | * | 5/1994 | Bauer | 433/174 |
| 5,340,254 | A | | 8/1994 | Hertel et al. | |
| 5,544,993 | A | | 8/1996 | Härle | |
| 6,565,302 | B2 | | 5/2003 | Werner et al. | |
| 7,195,437 | B2 | | 3/2007 | Sakamoto | |

FOREIGN PATENT DOCUMENTS

SU  1307111 A1  4/1987

* cited by examiner

*Primary Examiner* — Gary Estremsky
(74) *Attorney, Agent, or Firm* — Knobbe, Martens, Olson & Bear LLP (57) ABSTRACT

A thread forming screw thread fastener and a corresponding thread roll die are disclosed for fastening into a hole of a workpiece composed of low ductility material. More specifically, the thread forming screw thread has smooth radius thread flank which has a capability of deforming low ductile material such as magnesium, soft aluminum, thermoset plastics and other low ductility materials to deform the ductile material efficiently minimizing cracks, debris, low friction during installation and a maximum engagement of the screw with mating parts with the ductile material.

8 Claims, 7 Drawing Sheets

SECTION A-A

SECTION A-A

THREAD FORMING SCREW THREAD AND CORRESPONDING THREAD ROLL DIE

RELATED APPLICATIONS

This application is a U.S. National Phase of International Application No.: PCT/SG2007/000172, filed Jun. 20, 2007, designating the U.S. and published in English on Dec. 24, 2008 as WO 2008/156425.

FIELD OF THE INVENTION

This invention relates to a thread forming screw for forming an internal thread in low ductility material such as magnesium, aluminum alloy and the like and corresponding thread roll die to manufacture the thread of the screw.

BACKGROUND OF THE INVENTION

Designers of manufactured consumer goods are on a continuous endeavor to reduce product weight, highly recyclable materials, environmental friendly and energy savings solutions. This has lead to usage of aluminum alloy, magnesium alloys and other ductile material selected for particular application, in respect to the material properties, behavior and application feasibilities.

In recent years, there has been an increase in magnesium alloy applications in components such as personal computers, mobile phones, home appliances, intelligent transport systems and automobile parts.

Magnesium, at one-fourth the mass of steel and two-thirds that of aluminum, fulfills the requirements of the recent trends in the industry. The characteristics of magnesium are advantageous since magnesium has good fatigue strength, dimensional stability, sound and vibration dampening qualities are very useful for variable product application. It is also feasible to manufacture products with magnesium in various shapes, forms with repeatable consistency.

However, the low ductility and deformability of magnesium die-casts can lead to slivering, layer eruption, chipped threads, and fracturing when mated with standard thread bolts or thread-cutting fasteners. Removal and reinsertion of these fasteners can weaken and even destroy threads, creating magnesium powder, debris and contamination. If a magnesium die-cast application requires a removable fastener to permit service, a special screw thread is required enable to deform the material for reliable joint, and their formation and the fastening system employed in them are required to be flawless.

However, current conventional threads are limited in terms of performance to some critical quality and functional requirement in product assembly and applications. This has lead to attempts to improve screw thread design with added reliability and characteristic such as thread forming capability in a blind and pilot hole on low ductile materials, locking action, no thread and/or boss damage, high tightening force, high stripping torque, assembly efficiency, no cracks, minimize debris creation, re-usability (repeated removal and insertion), high failure torque, high torsional strength, resistance to vibration loosening, and positive material engagement. Often conventional screws require tapping prior to fastening the screw into the material which forms a thread or grooves in the side of the hole for threads of the screw to engage. Forming such tapping holes and grooves in the side walls of the hole contribute to fracturing and other disturbances in the ductile material which contributes to the weakening of the fastening and engagement of the fastener within the ductile material.

However as mentioned, the conventional threads do not adequately meet all or some of the above critical functional requirements, which weakens the integrity of the joints. For example, some previous threads that have been disclosed include, U.S. Pat. Nos. 7,195,437, 5,061,135, and 5,340,254.

Figure 1A:
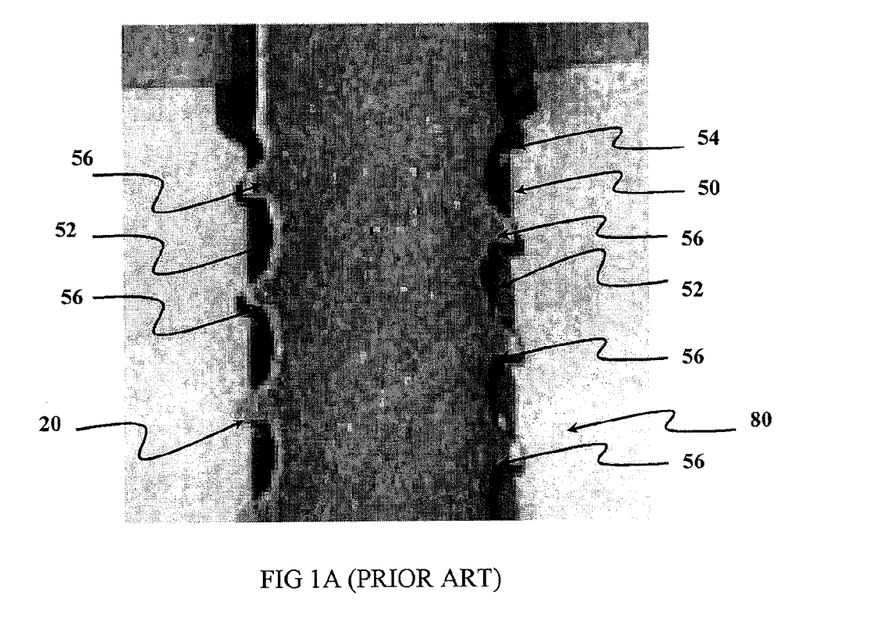
FIG. 1A-B show photo micrographic sectional views of thread forming screw of prior art of conventional threads.
Figure 1B:
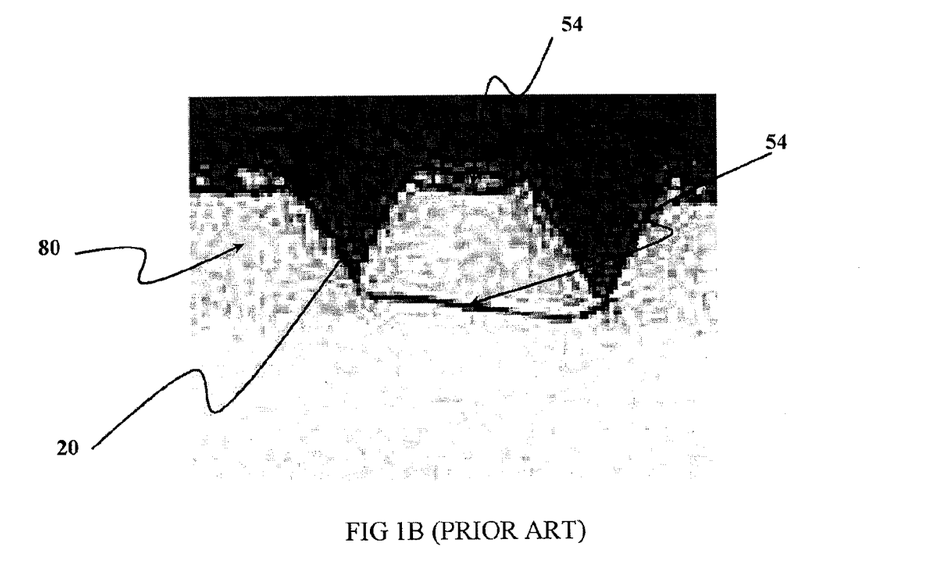

These previous screw threads have been employed in few applications on ductile materials such as magnesium and aluminum alloy, and attempt to provide sure insertion by virtue of their design, however the optimum result could not achieve in some applications such as positive engagement, failure torque, torsional strength, assembly efficiency and flexibility in product miniaturization which directly impact design solution and integrity in joints. FIG. 1A-B illustrate the limitations and some of the problems associated with the prior art. Specifically, FIG. 1A-B show a photo micrographic sectional view of a conventional screw thread, which is engaged in magnesium boss/plate 80 with pre formed hole 50 in the material where material fractures 54, insufficient of material deformation 52 and flank engagement 56 between thread crests 20 of the screw are observed.

Therefore, a thread forming screw thread and corresponding thread roll that alleviates the problems associated with the prior art is needed.

SUMMARY

In accordance with an aspect of the invention there is provided A thread forming screw thread fastener for fastening into a hole formed in a workpiece composed of ductile material, the fastener comprising: a head having a drive to be engaged with a driver bit; and a shank having threads having a minor diameter and a major diameter, the major diameter defining a thread crest of the screw and the minor diameter defining the thread root, the surface of the screw thread between adjacent thread crests forming a thread flank, the thread flank being a constant radius.

In an embodiment the surface of the thread flank may be continuously smooth. The surface of the thread flank transition between the flanks may be a constant radius. The threads, thread crest, thread root and thread flank may be arranged to deform the ductile material without cracking or damaging the surrounding ductile material of the work piece. The threads may be arranged to deform the ductile material of the workpiece against the surface of the thread flank. The radius of the thread flank may define a construction circle. The radius of the thread flank may define a construction circle which may determines the pitch of the thread. The pitch of the thread may be determined by the tangents between adjacent construction circles sharing a thread crest. The thread pitch of the fastener may allow maximum ductile material displacement towards the thread root. The hole that is bored in the ductile material may be a pilot hole. The major diameter of the fastener may range from 0.4 mm and above.

In accordance with an aspect of the invention there is provided a thread roll die for manufacturing thread forming screw thread fastener for fastening into a hole formed in a workpiece composed of ductile material, the fastener comprising a head having a drive to be engaged with a driver bit; and a shank having threads having a minor diameter and a major diameter, the major diameter defining a thread crest of the screw and the minor diameter defining the thread root, the surface of the screw thread between adjacent thread crests forming a thread flank, the thread flank being a constant radius.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

DETAILED DESCRIPTION

Embodiments of a screw thread in accordance with the invention are disclosed. In addition, corresponding roll thread die as shown and illustrated in FIG. 4A-B to manufacture the thread is disclosed. The thread forming screw is to have a high torsional strength, thread forming capabilities, which eliminates tapping process, thread forming torque, high failure torque, assembly efficiency, reduced hoop stress and reusability. The physical characteristics of embodiments of the invention also attributes to a reliable joint and assembly with deep thread engagement, more holding power, eliminate boss stripping, efficient deformation of low ductility material or ductile material without debris and cracks, comfortable margin between assembly and failure torques, reduce hoop stress by minimizing radial forces and eliminate boss bursting. The thread forming screw is engineered primarily for ductile material application, miniaturizations compatibility with smaller diameter and length as well feasibility to manufacture with lower cost. For example, in miniaturization applications the screw product size may range from about 0.4 mm or lower to about 2.0 mm. It will be appreciated that embodiments of the invention may be suitable for other applications and different scale than on the miniature scale and embodiments of the invention are not limited to the miniature scale, for example, 0.4 mm and above. It will be appreciated that any number of materials for the screw may be selected, for example, low carbon steel, stainless steel 300 and/or 400 series, aluminum, brass, titanium, other special high tensile materials, other materials according to specification and application, and the like.

Figure 2A:
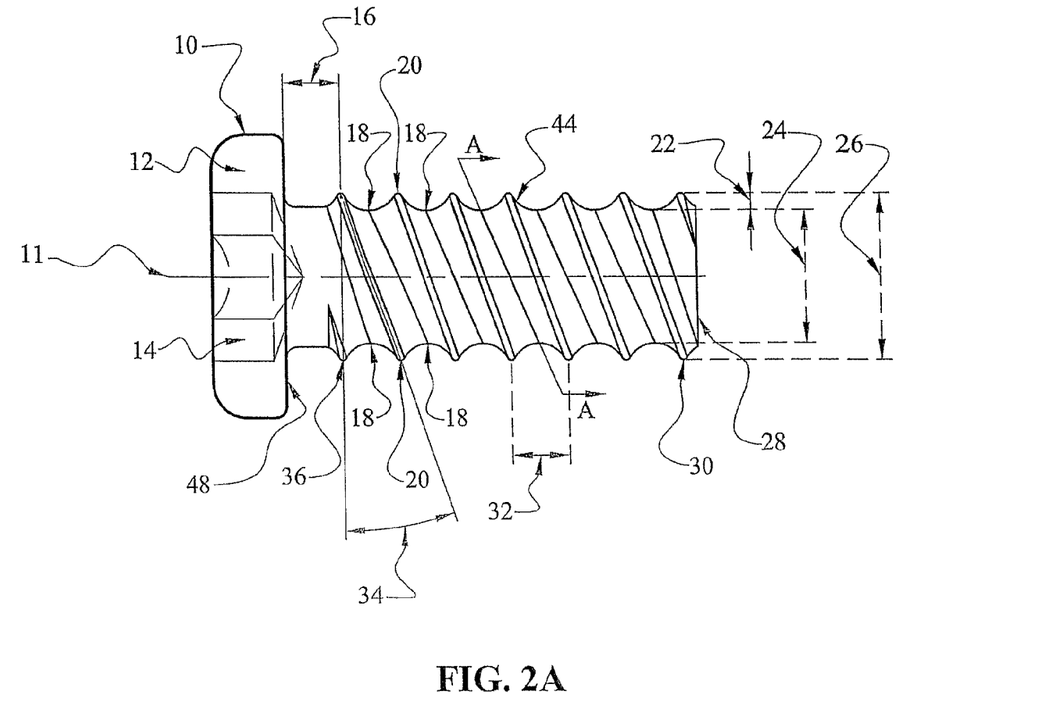
FIG. 2A-C show the side perspective view of the thread forming screw (FIG. 2A), the cross-section of the screw taken along line A-A in FIG. 2A (FIG. 2B), and the geometry and construction of the screw thread (FIG. 2C) in accordance with an embodiment of the invention; 30
Figure 2B:
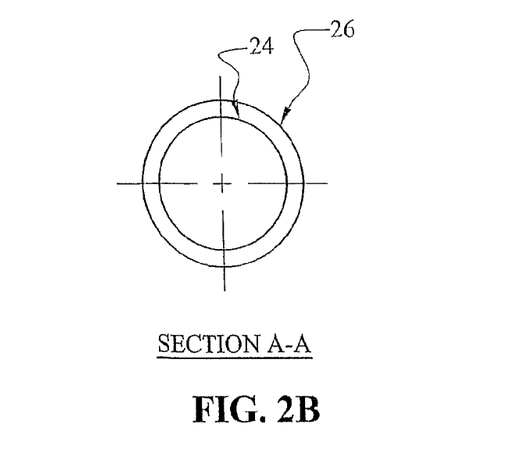
Figure 2C:
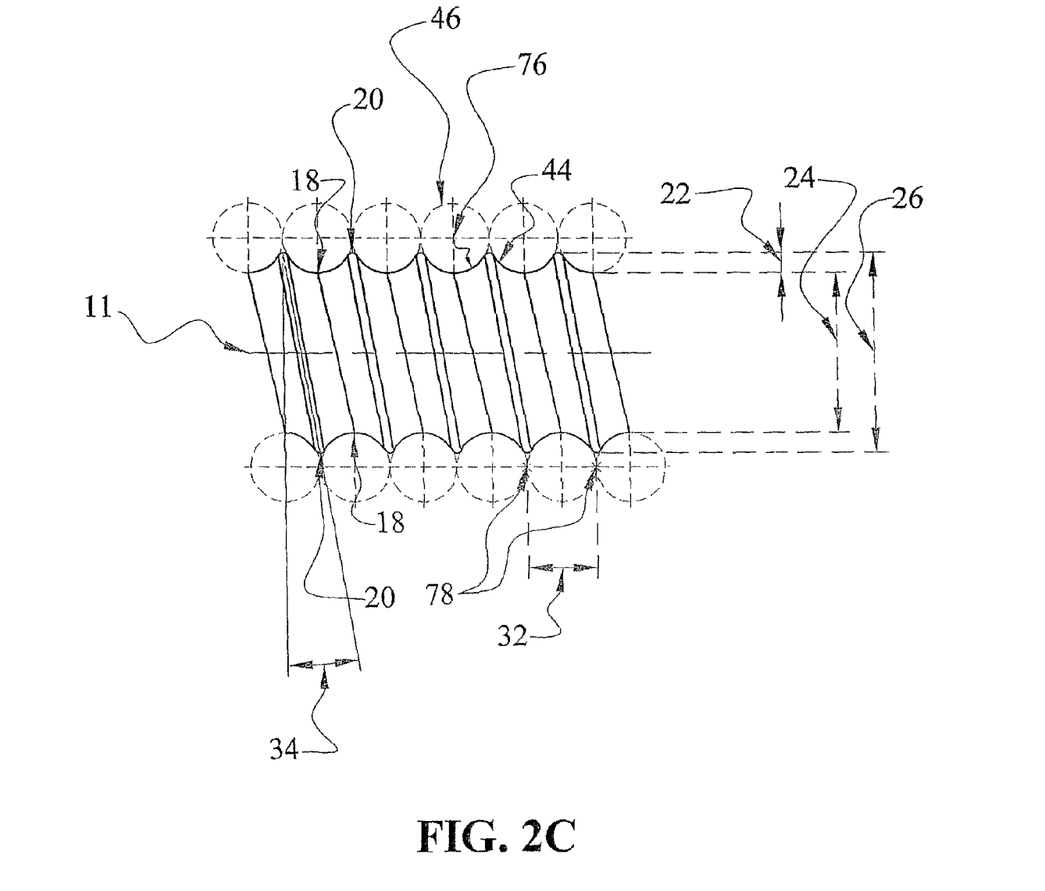
Figure 3A:
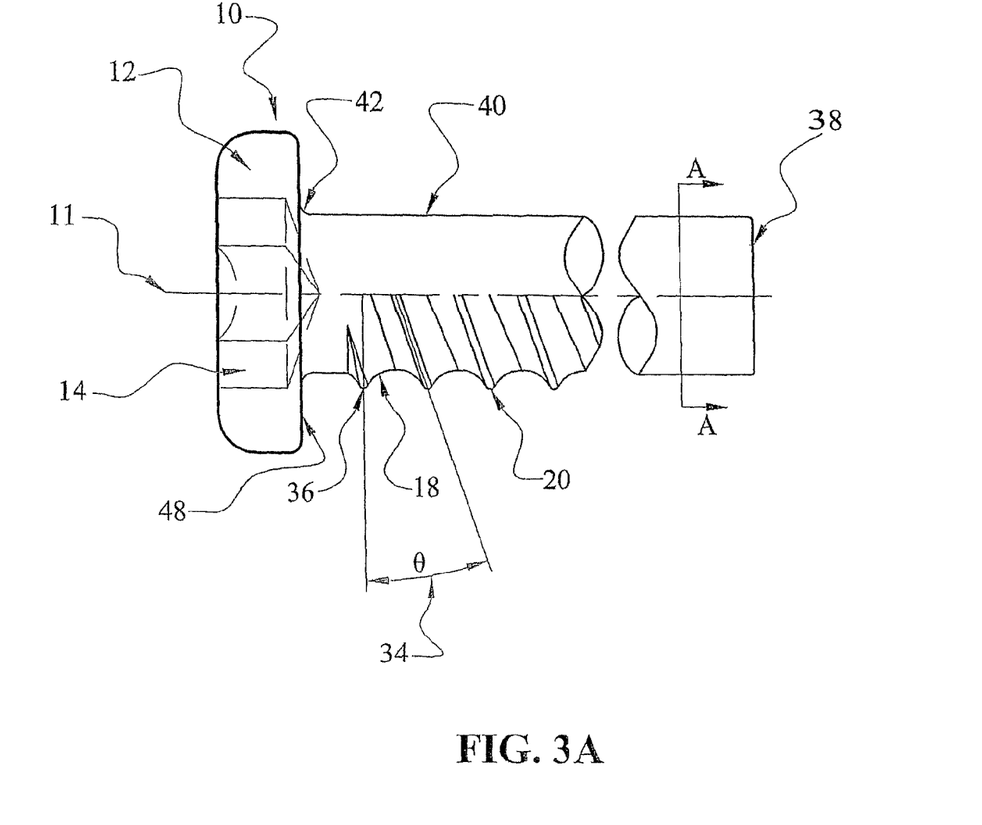
FIG. 3A-B show the side view and the cross sectional view of the screw where the thread forming screws is rolled from a cylindrical header blank (FIG. 3A) and the cross-section of the screws taken along line A-A in FIG. 3A (FIG. 3B) in accordance with an embodiment of the invention.
Figure 3B:
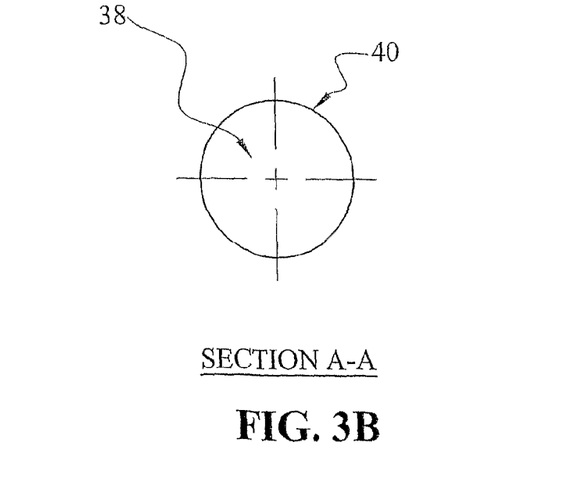

In the embodiment the thread forming screw 10 in FIG. 2A-C and FIG. 3A-B, having a head 12, recess 14 or drive, flat in surface and can be extended to various shapes such as circular, counter sunk, oval and the like. The thread forming screw 10 can be formed from any suitable material, such as a metal, having appropriate requisite properties and is rolled from a cylindrical cold form blank 40 with fillet radius 42 and blank point 38, as shown in FIG. 3A, with variable diameter and length based on requirement. The thread is extended from the bearing surface 48 of the head 12 and towards the thread end 28, and is the total length of the screw. The top region, from bearing surface 48 to the first complete thread 36 is the thread run out 16. The bottom region, thread end 28 is the lead thread 30, the thread end 28 is not limited as a flat surface as shown may but also be able to be manufactured with variable shapes such as tapered, round, sharp, dog point and others as per intended application. The central region is the full formed threads, with thread helix angle 34, radius thread crest 20 thread flanks 44, thread root 18, major diameter 26, minor diameter 24, thread pitch 32 and thread or flank height 22. The cross section configuration of thread forming screw is cylindrical, this allow the mating part with an engagement by a full circumferences engagement enable to achieve strong contact in the mating members, which prevents vibration loosening, high pull out force, high failure torque, boss stripping and reusability.

The thread forming screw thread according to an embodiment of the invention has a radius crest 20, radius flank 44 and a radius root 18. The concavity from flank 44 to root 18 is continuous since it is formed by arcs of the basic construction circles 46 having constant radii and whose centers 76 are disposed in same planes. The thread crest 20 is designed with smooth radius. The smooth radius crest 20, flank 44 is able to deform the ductile material of the workpiece, boss, plate or the like efficiently without any or minimizing cracks, minimal debris, low friction during installation and a maximum engagement of flank 44 in the mating parts. The wide spaced thread pitch 32 determined by the design of the screw of constant radius thread flank, in comparison with conventional screw threads that do not have configuration of thread flank of constant radius, allows maximum material displacement towards the thread root 18 without any interruption or damage to the internal structure of the ductile material of the workpiece, boss, plate or the like.

Embodiments of the invention relate to a thread forming screw 10 as shown in FIG. 2A-C. In FIG. 2A, a thread forming screw is shown having a symmetrical thread profile around a central axis 11 with a constant radius transition between the flanks 44 and to the root of the thread 18. The flanks 44 of the thread are developed with a constant construction circle 46. The pitch of the thread 32 may be determined by the tangent 78 between each of the adjacent construction circles proximate, on either side, or sharing a common or same thread crest 20. The construction circles 46 are shown in FIG. 2C. The root radius 18 is constant and continuous since the same arc of the basic circles 46 forms the root radius. However, it will be appreciated that the lead thread 30 and the thread end 28 can be manufactured with tapered end, rounded, dog point, and/or sharp point based and the like on application needs.

An embodiment of the invention is an improved thread forming screw, which has a capability of deforming low ductile material such as magnesium, soft aluminum, thermoset plastics and other low ductility materials. The smooth radius flank 44 from the crest 20 steadily increases towards the roots, which accommodate the material to deform easily in the valleys of the threads and flow out over to the root 18. Crack formation, boss burst and chipping are avoided and thus providing a positive and optimum flank engagement 56 in the joint. The cross sectional configuration of the thread major diameter 26 and minor or root diameter 24 is cylindrical in shape.

Figure 4A:
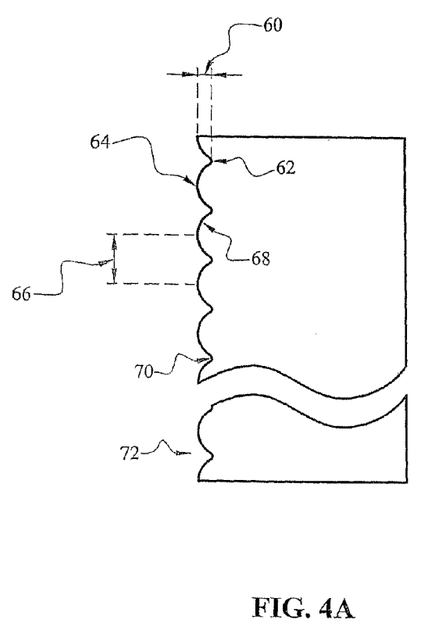
FIG. 4A-B show the side view of the roll thread die to form the thread (FIG. 4A) and the face of the roll thread die (FIG. 4B) in accordance with an embodiment of the invention.
Figure 4B:
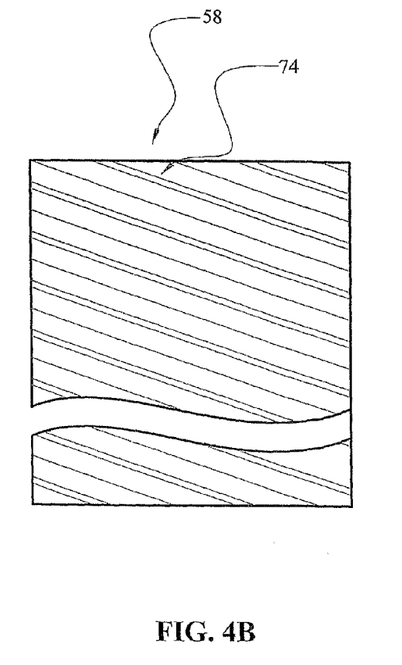

In another aspect of the invention, a thread roll die 58 is disclosed for manufacturing the thread forming screw, as shown in FIGS. 4A and 4B. The thread roll die 58 is comprises the profile of the thread forming screw with thread depth 60, internal radius die root 62, external circular die face 64, external die face pitch 66, flank radius 68, crest radius 70, roll thread die end 72 is roll thread die face 74. In this embodiment roll thread die end 72 are flexible to design enable to accommodate thread end 28 configurations, which is stated above.

FIGS. 4A and 4B show the thread forming screw thread roll die 58 is disclosed for manufacturing the thread, the thread roll die 58 is comprises of the same profile of the thread forming screw with thread die depth 60, Internal die root 62, external die face 64, external die face pitch 66, flank radius 68, crest radius 70, roll thread die end 72 and roll thread die face 74. It will be appreciated that any number of materials for manufacture of the thread roll die may be selected as a suitable material, for example, carbide, tool steel, high speed steel for example M42, and the like and other materials according to specification and application, and the like.

Figure 5A:
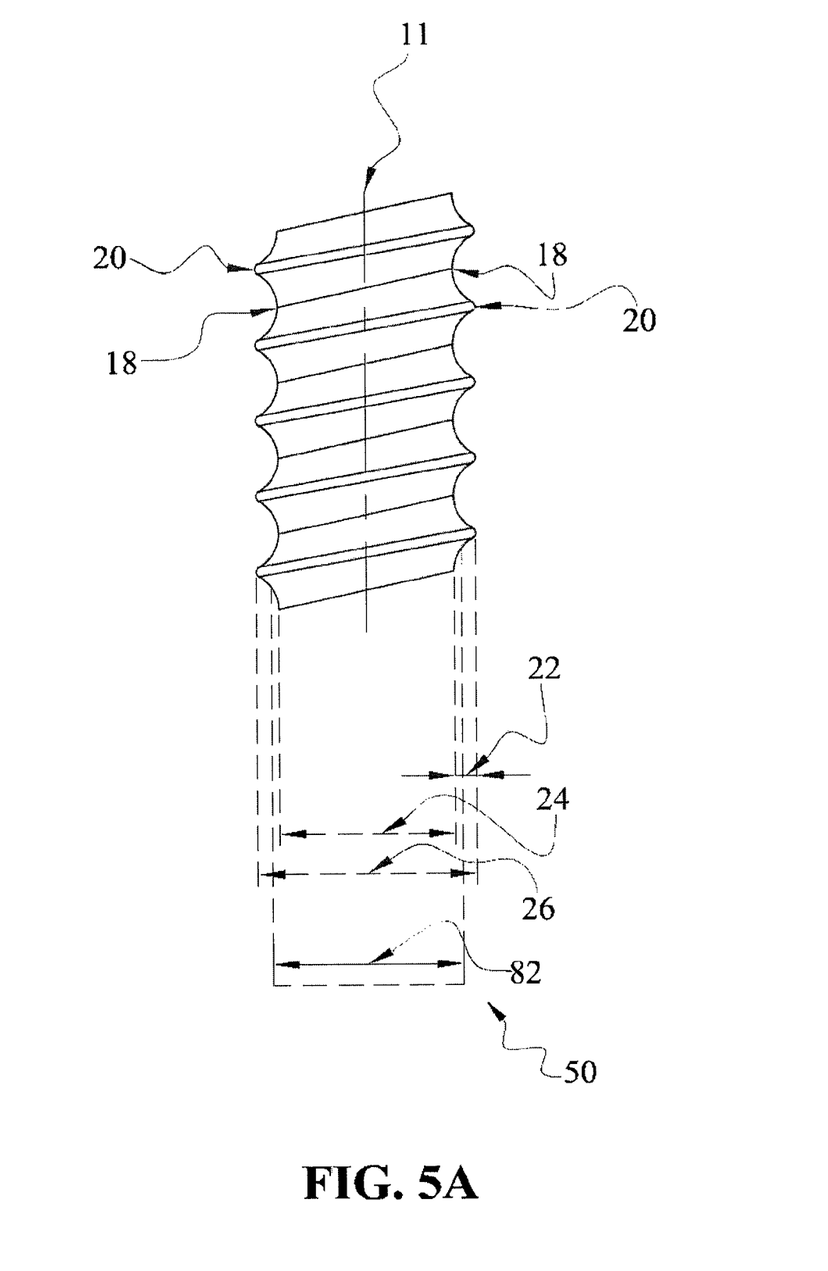
FIG. 5A-C a show cross sectional view of an assembled thread forming screw in magnesium (FIG. 5A), a photomicrographic sectional view of an assembled thread forming screw in magnesium (FIG. 5B), and an enlarged view of the screw of FIG. 5B which shows the thread forming screw with circular thread configuration deform in magnesium material without any layer eruption, chipped threads and/or fracture to the mating member (FIG. 5B) in accordance with an embodiment of the invention.
Figure 5B:
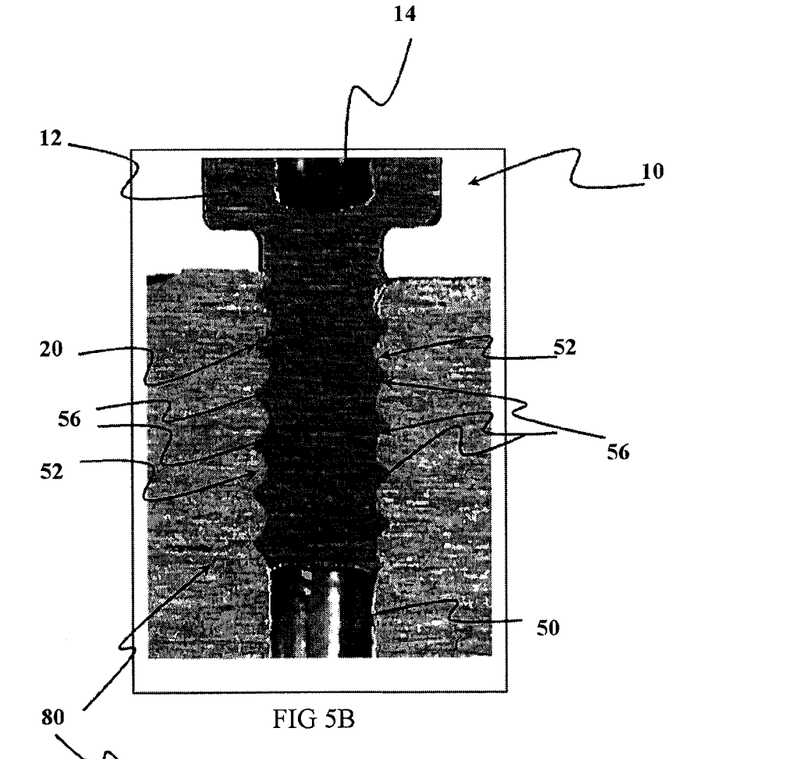
Figure 5C:
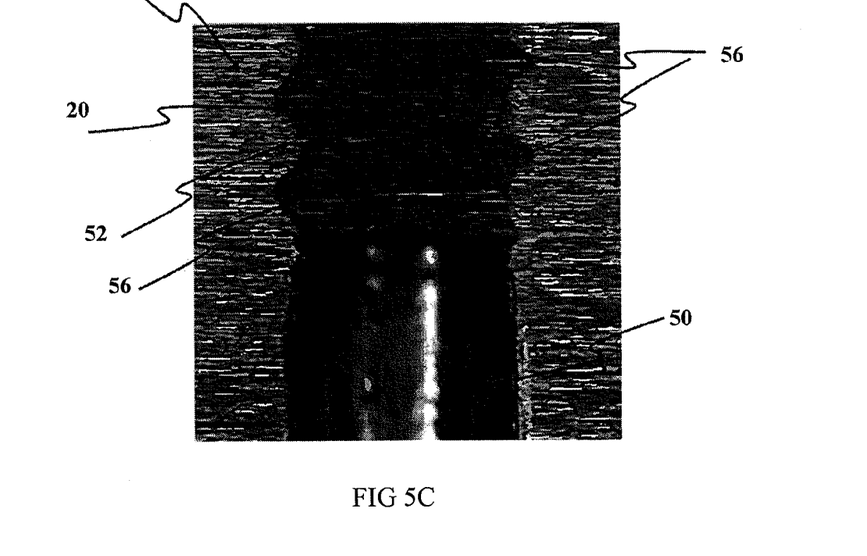

FIG. 5A shows a cross sectional view of an assembled thread forming screw in magnesium in accordance with an embodiment of the invention. FIG. 5B shows a photomicrographic sectional view of an assembled thread forming screw in magnesium, and FIG. 5C shows an enlarged view of the screw of FIG. 5B which shows the thread forming screw with circular thread configuration deformed in magnesium material without any layer eruption, chipped threads and/or fracture to the mating member in accordance with an embodiment of the invention. FIG. 5A shows the pilot hole 50 that is bored in the low ductile material workpiece and has a diameter 82 between the minor diameter 24 and major diameter 26 of the thread. In FIG. 5B-C the photo micrographic sectional views of the thread forming screw are engaged in magnesium boss/plate 80 with pilot hole 50. Embodiments of the invention are specifically designed to eliminate tapping operation and forming a strong thread by perfect flank engagement 56 and deformation of material 52 from the flank 44 towards the thread root 18. FIG. 5C shows in more detail on an enlarged cross sectional view of FIG. 5B, which shows no cracks, layer eruption, chipped threads that are observed.

Whilst there has been described in the foregoing description preferred embodiments of the present invention, it will be understood by those skilled in the technology concerned that many variations or modifications in details of design or construction may be made without departing from the present invention.

The invention claimed is:

1. A thread forming screw thread fastener fastened into a hole formed in a workpiece composed of low ductility material, the fastener being made of metal and comprising: a head having a drive to be engaged with a driver bit; and a shank having threads having a minor diameter and a major diameter, the major diameter defining a thread crest of the screw and the minor diameter defining the thread root, the surface of the screw thread between adjacent thread crests forming a thread flank, the surface being defined by a construction circle having a constant radius, wherein a pitch of the thread is determined by a perpendicular distance between common tangents of adjacent construction circles sharing a thread crest, and the perpendicular distance between the common tangents is approximately twice the constant radius of the construction circle and wherein the fastener is threaded into a pilot hole drilled in magnesium.

2. A fastener as claimed in claim 1 wherein the surface of the thread flank is continuously smooth.

3. A fastener as claimed in claim 1 wherein the surface of the thread flank transition between the flanks is a constant radius.

4. The fastener as claimed in claim 1 wherein the surface of the thread flank and the thread crest having a surface formed of a constant radius are arranged to deform the low ductility material without cracking or damaging the surrounding low ductility material of the work piece.

5. The fastener as claimed in claim 4 wherein the surface of the thread flank and the thread crest are arranged to deform the low ductility material of the workpiece against the surface of the thread flank.

6. The fastener as claimed in claim 1 wherein the thread pitch of the fastener allows maximum low ductility material displacement towards the thread root.

7. The fastener as claimed in claim 1 wherein the hole that is bored in the low ductility material has a diameter between the minor diameter and major diameter of the thread.

8. The fastener as claimed in claim 1 wherein major diameter of the fastener ranging from 0.4 mm and above.

\* \* \* \* \*